US012597975B2

(12) United States Patent
Yoshida et al.

(10) Patent No.: US 12,597,975 B2
(45) Date of Patent: Apr. 7, 2026

(54) BASE STATION, COMMUNICATION TERMINAL, AND COMMUNICATION METHOD FOR BASE STATION

(71) Applicant: NEC Corporation, Tokyo (JP)

(72) Inventors: Kohei Yoshida, Tokyo (JP); Masakazu Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/754,567

(22) Filed: Jun. 26, 2024

(65) Prior Publication Data

US 2025/0015864 A1 Jan. 9, 2025

(30) Foreign Application Priority Data

Jul. 7, 2023 (JP) ................................. 2023-112538

(51) Int. Cl.
| | |
|---|---|
| *H04L 5/12* | (2006.01) |
| *H04B 7/06* | (2006.01) |
| *H04B 7/08* | (2006.01) |

(52) U.S. Cl.
CPC ......... *H04B 7/068* (2013.01); *H04B 7/06958* (2023.05); *H04B 7/088* (2013.01)

(58) Field of Classification Search
CPC ..... H04B 7/068; H04B 7/06958; H04B 7/088
USPC ................ 375/262, 260, 259, 219, 295, 316
See application file for complete search history.

(56) References Cited

U.S. PATENT DOCUMENTS

| | | | |
|---|---|---|---|
| 2020/0186231 A1 | 6/2020 | Cao | |
| 2020/0275260 A1 | 8/2020 | Huang et al. | |
| 2020/0382171 A1* | 12/2020 | Uchino | H04B 7/06952 |
| 2020/0382186 A1* | 12/2020 | Uchino | H04B 7/0617 |

FOREIGN PATENT DOCUMENTS

| | | |
|---|---|---|
| JP | H10-145317 A | 5/1998 |
| JP | 2009-200824 A | 9/2009 |
| JP | 2018-121190 A | 8/2018 |
| JP | 2020-533842 A | 11/2020 |
| JP | 2020-536413 A | 12/2020 |

* cited by examiner

*Primary Examiner* — Zewdu A Kassa
(74) *Attorney, Agent, or Firm* — Sughrue Mion, PLLC

(57) ABSTRACT

Provided is a base station including: an antenna that emits at least one searching radio beam for searching for a communication terminal and a communication radio beam for communicating with a communication terminal; and at least one processor that executes a transmission process of simultaneously transmitting, from the antenna, a plurality of searching radio beams that are oriented in directions which are different from each other, a reception process of receiving radio waves transmitted from a communication terminal in accordance with the plurality of searching radio beams simultaneously transmitted in the transmission process, and a communication process of communicating, with use of the communication radio beam, with the communication terminal that transmitted the radio waves which were received in the reception process.

11 Claims, 8 Drawing Sheets

FIG. 2

BASE STATION, COMMUNICATION TERMINAL, AND COMMUNICATION METHOD FOR BASE STATION

This Nonprovisional application claims priority under 35 U.S.C. § 119 on Patent Application No. 2023-112538 filed in Japan on Jul. 7, 2023, the entire contents of which are hereby incorporated by reference.

TECHNICAL FIELD

The present disclosure relates to a base station, a communication terminal, and a communication method for a base station.

BACKGROUND ART

Communication systems for communication between a base station and a communication terminal are known. Examples of the communication systems include a wireless communication system disclosed in Patent Literature 1.

CITATION LIST

Patent Literature

Patent Literature 1

Japanese Patent Application Publication Tokukai No. 2018-121190

SUMMARY OF INVENTION

Technical Problem

In the wireless communication system disclosed in Patent Literature 1, communication between a base station and a terminal is performed by the base station forming a beam toward the direction of the terminal.

However, in order to identify a terminal with which the base station communicates, it is necessary for the base station to, for example, scan a beam to search for the terminal. Thus, there is a waiting time until the terminal receives the beam, and therefore it takes time to search for the terminal.

The present disclosure has been accomplished in view of the above problem, and an example object thereof is to provide a base station, a communication terminal, and a base station communication method which are intended to improve the efficiency in a search for a communication terminal.

Solution to Problem

A base station in accordance with an example aspect of the present disclosure is a base station for a communication terminal, the base station including: an antenna that emits at least one searching radio beam for searching for a communication terminal and a communication radio beam for communicating with a communication terminal; and at least one processor, the at least one processor being configured to execute a transmission process of simultaneously transmitting, from the antenna, a plurality of searching radio beams that are oriented in directions which are different from each other, a reception process of receiving radio waves transmitted from a communication terminal in accordance with the plurality of searching radio beams simultaneously transmitted in the transmission process, and a communication process of communicating, with use of with the communication radio beam, the communication terminal that transmitted the radio waves which were received in the reception process.

A communication terminal in accordance with an example aspect of the present disclosure is a communication terminal that communicates with the base station in accordance with an example aspect of the present disclosure, the communication terminal including an antenna that transmits and receives radio waves and at least one processor, the at least one processor being configured to execute a reception process of receiving, via the antenna, any of a plurality of searching radio beams that have been transmitted from the base station and that are oriented in directions which are different from each other, an extraction process of extracting, from a searching radio beam received in the reception process, direction identification information that identifies a direction of the base station, a transmission process of transmitting a radio beam toward the base station based on the direction identification information that has been extracted in the extraction process, and a communication process of communicating with the base station with use of the radio beam that has been transmitted in the transmission process.

A base station communication method in accordance with an example aspect of the present disclosure is a communication method for a base station, the method including: a transmission process of transmitting, from an antenna, a plurality of searching radio beams that are oriented in directions which are different from each other; a reception process of receiving radio waves transmitted from a communication terminal in accordance with the plurality of searching radio beams transmitted in the transmission process; and a communication process of communicating, with use of with the communication radio beam, the communication terminal that transmitted the radio waves which were received in the reception process.

Advantageous Effects of Invention

An example aspect of the present disclosure brings about an example advantage of improving the efficiency in a search for a communication terminal.

BRIEF DESCRIPTION OF DRAWINGS

FIG. 2 is a flowchart illustrating the flow of a communication method in the communication system in accordance with an aspect of the present disclosure.

EXAMPLE EMBODIMENTS

Figure 1:
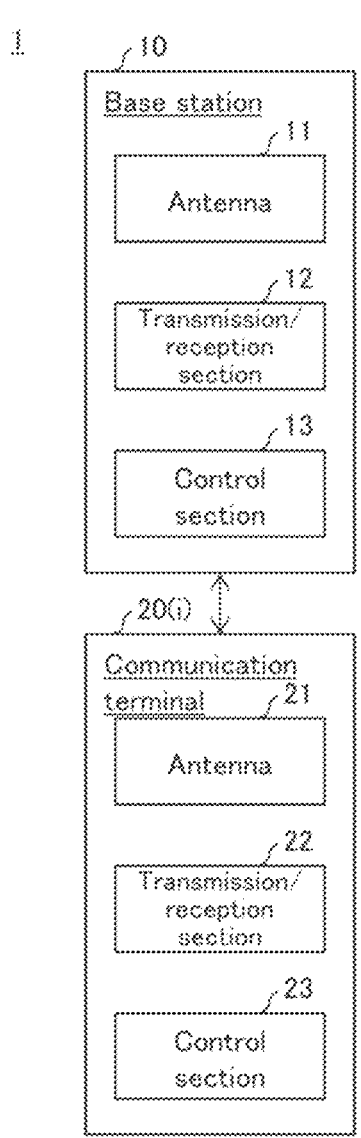
FIG. 1 is a block diagram illustrating the configuration of a communication system in accordance with an aspect of the present disclosure.

The following description will discuss an example embodiment of the present invention. Note, however, that the present invention is not limited to example embodiments discussed below, but may be altered in various ways by a skilled person within the scope of the claims. For example, the present invention also encompasses, in its scope, any example embodiment derived by appropriately combining technical means employed in the example embodiments discussed below. The present invention also encompasses, in its scope, any example embodiment derived by appropriately omitting part of technical means employed in the example embodiments described below. The example advantages described in each of the example embodiments below are example advantages expected in that example embodiment, and do not define an extension of the present invention. That is, the present invention also encompasses, in its scope, any example embodiment that does not bring about the example advantages discussed in the example embodiments below.

First Example Embodiment

A first example embodiment, which is an example embodiment of the present invention, will be discussed in detail with reference to the drawings. The present example embodiment is a basic form of each example embodiment discussed later. It should be noted that the scope of an application of technical means employed in the present example embodiment is not limited to the present example embodiment. That is, technical means employed in the present example embodiment can be employed also in another example embodiment included in the present disclosure, provided that no particular technical problems occur. In addition, technical means indicated in the drawings referred to for discussing the present example embodiment can be employed also in the other example embodiment included in the present disclosure, provided that no particular technical problems occur.

(Configuration of Communication System)

A configuration of a communication system 1 will be discussed with reference to FIG. 1. FIG. 1 is a block diagram illustrating the configuration of the communication system 1. As illustrated in FIG. 1, the communication system 1 includes a base station 10 and at least one communication terminal 20(*i*).

(Configuration of Base Station)

The base station 10 is for at least one communication terminal 20(*i*), and includes an antenna 11, a transmission/reception section 12, and a control section 13. The antenna 11 is driven by the transmission/reception section 12 to emit (transmit) a searching radio beam B1 and a communication radio beam B2 and to receive radio waves from the communication terminal 20(*i*). The searching radio beam B1 is for searching for the communication terminal 20(*i*). The communication radio beam B2 is for communicating with the communication terminal 20(*i*).

As indicated in a communication method S1a discussed later, the control section 13 executes a transmission process S11*a*, a reception process S12*a*, and a communication process S13*a*. The transmission process S11*a* is a process of simultaneously transmitting, from the antenna 11, a plurality of searching radio beams B1 that are oriented in directions which are different from each other. The reception process S12*a* is a process of receiving radio waves transmitted (in a transmission process S12*b*) from the communication terminal 200(*i*) in accordance with the plurality of searching radio beams B1 simultaneously transmitted in the transmission process S11*a*. The communication process S13*a* is a process of communicating, with use of the communication radio beam B2, with the communication terminal 20(*i*) that transmitted (in the transmission process S12*b*) the radio waves which were received in the reception process S12*a*.

(Configuration of Communication Terminal)

The communication terminal 20(*i*) communicates with the base station 10, and includes an antenna 21, a transmission/reception section 22, and a control section 23. The antenna 21 is driven by the transmission/reception section 22 to receive the searching radio beam B1 and the communication radio beam B2 and to transmit the radio waves. The communication terminal 20(*i*) is capable of communicating with the base station 10 using the communication radio beam B2 from the base station 10 and the radio waves from the communication terminal 20(*i*) itself. The control section 23 executes a communication method S1*b* discussed later.

(Flow of Communication Method in Communication System 1)

Figure 2:
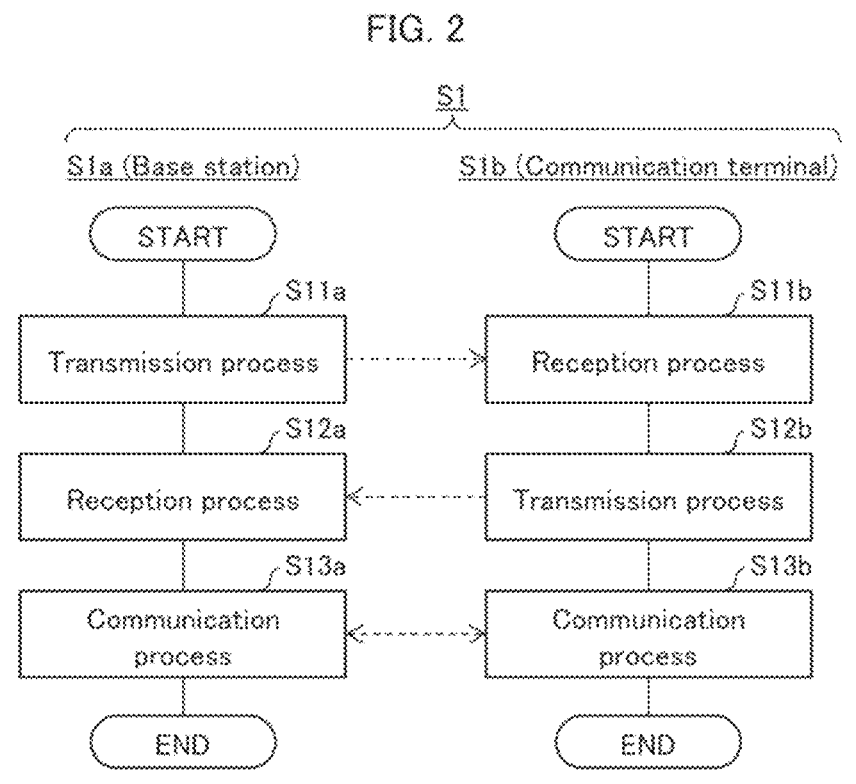

A flow of the communication method S1 in the communication system 1 will be discussed with reference to FIG. 2. FIG. 2 is a flowchart illustrating the flow of the communication method S1. As illustrated in FIG. 2, the communication method S1 can be divided into the communication method S1a employed by the base station 10 and the communication method S1*b* employed by the communication terminal 20(*i*).

The communication method S1a employed by the base station 10 includes the transmission process S11*a*, the reception process S12*a*, and the communication process S13*a*. The transmission process S11*a* is a process of transmitting, from the antenna, a plurality of searching radio beams that are oriented in directions which are different from each other. The reception process S12*a* is a process of receiving radio waves transmitted from the communication terminal 20(*i*) in accordance with the plurality of searching radio beams B1 transmitted in the transmission process S11*a*. The communication process S13*a* is a process of communicating, with use of the communication radio beam B2, with the communication terminal 20(*i*) that transmitted the radio waves which were received in the reception process S12*a*. The communication method S1*b* employed by the communication terminal 20(*i*) includes a reception process S11*b*, the transmission process S12*b*, and a communication process S13*b*. The communication methods S1*a* and S1*b* are executed as discussed below.

(1) Transmission of Searching Radio Beams B1 from Base Station 10 (Transmission Process S11*a*)

The control section 13 of the base station 10 controls the transmission/reception section 12 to execute a transmission process of simultaneously transmitting, from the antenna 11, the plurality of searching radio beams B1 that are oriented in directions which are different from each other.

(2) Reception of Searching Radio Beam B1 by Communication Terminal 20(*i*) (Reception Process S11*b*)

The control section 23 of the communication terminal 20(*i*) executes a reception process of receiving, via the antenna 21, any of the plurality of searching radio beams B1 that have been transmitted from the base station 10 and that are oriented in directions which are different from each other.

(3) Transmission of Radio Waves from Communication Terminal 20(*i*) (Transmission Process S12*b*)

The control section 23 of the communication terminal 20(*i*) executes a transmission process of transmitting radio waves from the antenna 21 in accordance with the searching radio beam B1 that has been transmitted from the base station 10.

(4) Reception of Radio Waves by Base Station 10 (Reception Process S12*a*)

The control section 13 of the base station 10 executes a reception process of receiving the radio waves transmitted from the communication terminal 20(*i*) in accordance with the plurality of searching radio beams B1 simultaneously transmitted in the transmission process S11*a*. This enables the control section 13 of the base station 10 to start communicating with the communication terminal 20(*i*) based on the understanding that the searching radio beam B1 has been received by the communication terminal 20(*i*).

(5) Communication Between Base Station 10 and Communication Terminal 20(*i*) (Communication Processes S13*a*, S13*b*)

The control section 13 of the base station 10 uses the communication radio beam B2 to execute a communication process of communicating with the communication terminal 20(*i*) that transmitted the radio waves received in the reception process S12*a*. Meanwhile, the control section 23 of the communication terminal 20(*i*) uses the radio beam transmitted in the transmission process S12*b* to execute a communication process of communicating with the base station 10.

It should be noted here that the communication terminal 20(*i*) is capable of communicating with the base station 10 with use of radio waves that substantially do not include directivity. However, when the antenna 21 of the communication terminal 20(*i*) can transmit a radio beam including directivity, the communication terminal 20(*i*) may communicate with the base station 10 with use of radio waves (i.e., radio beam) including directivity.

(Example Advantage of Base Station)

As has been discussed, the base station 10 executes the transmission process of simultaneously transmitting, from the antenna 11, a plurality of searching radio beams that are oriented in directions which are different from each other. Thus, with the base station 10, it is possible to search for a communication terminal 20(*i*) more efficiently in comparison with a case where a single searching radio beam B1 is scanned.

(Example Advantage of Communication Method for Base Station)

As has been discussed, the communication method S1*a* employs the configuration of the transmission process of simultaneously transmitting, from the antenna 11, a plurality of searching radio beams that are oriented in directions which are different from each other. Thus, with the communication method S1*a*, it is possible to search for a communication terminal 20(*i*) more efficiently in comparison with a case where a single searching radio beam B1 is scanned.

Second Example Embodiment

A second example embodiment, which is an example embodiment of the present invention, will be discussed in detail with reference to the drawings. Members having functions identical to those of the respective members discussed in the foregoing example embodiment are given respective identical reference numerals, and the description of those members is omitted as appropriate. It should be noted that the scope of an application of technical means employed in the present example embodiment is not limited to the present example embodiment. That is, technical means employed in the present example embodiment can be employed also in another example embodiment included in the present disclosure, provided that no particular technical problems occur. In addition, technical means indicated in the drawings referred to for discussing the present example embodiment can be employed also in the other example embodiment included in the present disclosure, provided that no particular technical problems occur.

(Configuration of Communication System)

Figure 3:
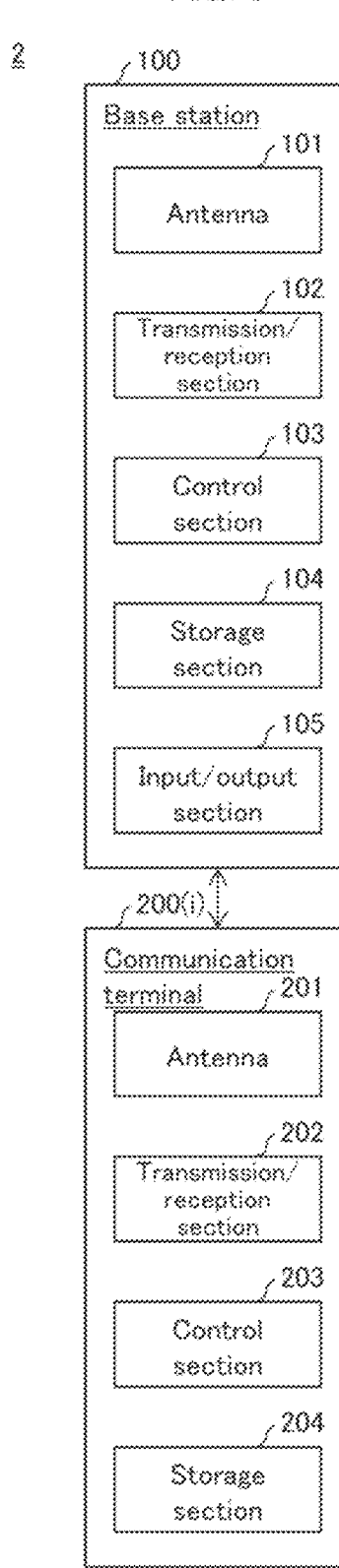
FIG. 3 is a block diagram illustrating the configuration of a communication system in accordance with an aspect of the present disclosure.

A configuration of a communication system 2 will be discussed with reference to FIG. 3. FIG. 3 is a block diagram illustrating the configuration of the communication system 2. As illustrated in FIG. 1, the communication system 2 includes a base station 100 and at least one communication terminal 200(*i*).

(Configuration of Base Station)

The base station 100 is for the communication terminal 200(*i*), and includes an antenna 101, a transmission/reception section 102, a control section 103, a storage section 104, and an input/output section 105. The antenna 101 is driven by the transmission/reception section 102 to emit a searching radio beam B1 and a communication radio beam B2. The searching radio beam B1 is for searching for the communication terminal 200(*i*). The communication radio beam B2 is for communicating with the communication terminal 200(*i*). The control section 103 executes a communication method S10*a* discussed later. The storage section 104 stores a table Ta. In the table Ta, the frequencies and the transmission directions of a plurality of searching radio beams and at least one selected from the group consisting of the number of the plurality of searching radio beams B1, the type of the antenna 101, and the interference state of radio waves are preferably indicated in such a manner as to be associated with each other. The interference state of radio waves means interference between response radio beams that have been transmitted from a plurality of communication terminals 20(*i*) to the base station 100 within the width of the searching radio beam B1. As discussed later, the width, the emission direction, and the like of the searching radio beam B1 can be adjusted according to the interference state of the radio waves from the plurality of communication terminals 20(*i*). The input/output section 105 is an apparatus into/from which an administrator of the base station 100 inputs/outputs information such as a keyboard, a display apparatus, or a touch display, and can be used for inputting/outputting a transmission/reception condition of the base station 100.

(Configuration of Communication Terminal)

The communication terminal 200(*i*) communicates with the base station 100, and includes an antenna 201, a transmission/reception section 202, a control section 203, and a storage section 204. The antenna 201 is driven by the transmission/reception section 202 to transmit and receive radio waves. The communication radio beam B2 is for communicating with the communication terminal 200(*i*). The control section 203 executes a communication method S10*b* (discussed later) that includes a reception process S111*b*, an extraction process S112*b*, a transmission process S113*b*, and a communication process S121*b*. The reception process S111*b* is a process of receiving, via the antenna 201, any of a plurality of searching radio beams B1 that have been transmitted from the base station 100 and that are oriented in directions which are different from each other. The extraction process S112*b* is a process of extracting, from a searching radio beam B1 received in the reception process S111*b*, direction identification information that identifies the direction of the base station 100. The transmission process S113*b* is a process of transmitting a radio beam toward the base station 100 based on the direction identification information that has been extracted in the extraction process S112*b*. The communication process S121*b* is a process of communicating with the base station 100 with use of the radio beam that has been transmitted in the transmission process S113*b*. The storage section 204 stores a table Tb. In the table Tb, the direction of the base station 100 and direction identification information, which is included in the searching radio beam B1 and which identifies the direction of the base station, are indicated in such a manner as to be associated with each other.

(Flow of Communication Method in Communication System 2)

Figure 4:
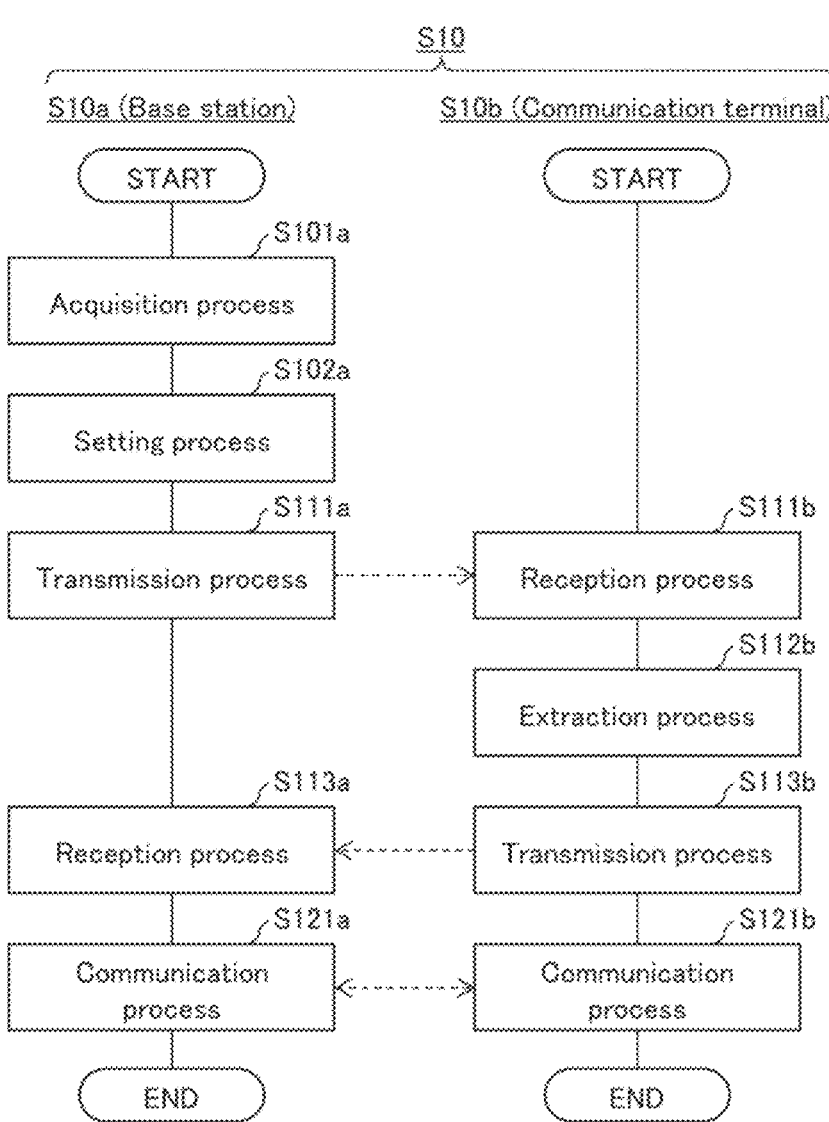
FIG. 4 is a flowchart illustrating the flow of a communication method in the communication system in accordance with an aspect of the present disclosure.

A flow of the communication method S1 in the communication system 1 will be discussed with reference to FIG. 4. FIG. 4 is a flowchart illustrating the flow of the communication method S10. As illustrated in FIG. 4, the communication method S10 can be divided into the communication method S10*a* employed by the base station 100 and the communication method S10*b* employed by the communication terminal 200(*i*). The communication method S10*a* includes an acquisition process S101*a*, a setting process 102*a*, a transmission process S111*a*, a reception process S113*a*, and a communication process S121*a*. The communication method S10*b* includes the reception process S111*b*, the extraction process S112*b*, the transmission process S113*b*, and the communication process S121*b*. The communication methods S10*a* and S10*b* are executed as discussed below.

A. Acquisition of Transmission/Reception Condition of Base Station 100 (Acquisition Process S101*a*)

The control section 103 of the base station 100 executes an acquisition process of acquiring a transmission/reception condition of the base station 100. The transmission/reception condition includes information of at least one selected from the group consisting of the number of the plurality of searching radio beams B1, the type of the antenna (including performance), and the interference state of the radio waves. This condition may be acquired by the control section 103 from the transmission/reception section 102 or the like, or may be input by an administrator via the input/output section 105.

B. Setting of Condition in Base Station 100 (Setting Process S102*a*)

Based on the table Ta, the control section 103 of the base station 100 sets a pattern of the searching radio beam B1 to be transmitted in the transmission process S111*a*.

Basically, the control section 103 can set, based on the table Ta, the frequencies and the transmission direction of a plurality of searching radio beams B1. For example, the table Ta indicates the frequencies and the transmission directions of the plurality of searching radio beams B1 in such a manner that the frequencies and the transmission directions are associated with each other. The control section 103 can set the frequencies and the transmission directions of the plurality of searching radio beams B1 based on the table Ta, and transmit the plurality of searching radio beams B1.

In doing so, the control section 103 can set the frequencies and the transmission directions of the plurality of searching radio beams B1 based on the acquired transmission/reception conditions (the number of the plurality of searching radio beams B1, the type of the antenna, and the interference state of the radio waves). For example, in the table Ta, the transmission/reception conditions and the frequencies and the transmission directions of the plurality of searching radio beams B1 are indicated in such a manner as to be associated with each other. The control section 103 can set the frequencies and the transmission directions of the plurality of searching radio beams B1 based on the table Ta, and transmit the plurality of searching radio beams B1.

Figure 5:
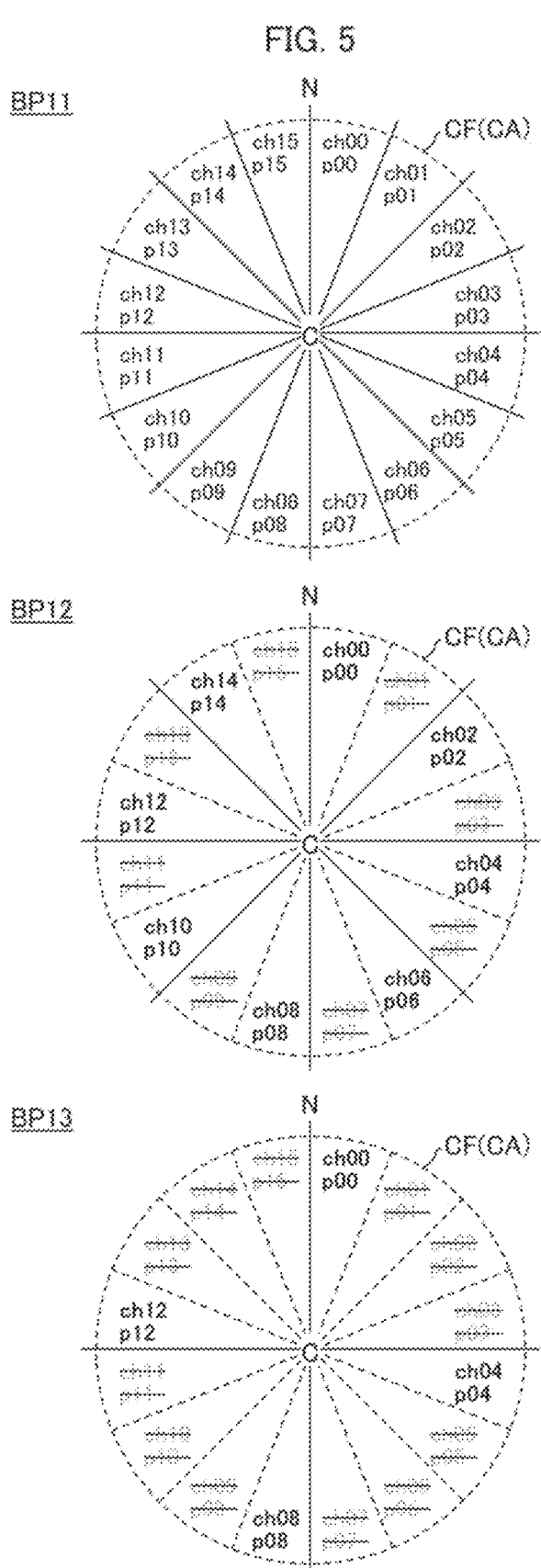
FIG. 5 is a view schematically illustrating a distribution of beams in accordance with an aspect of the present disclosure.
Figure 6:
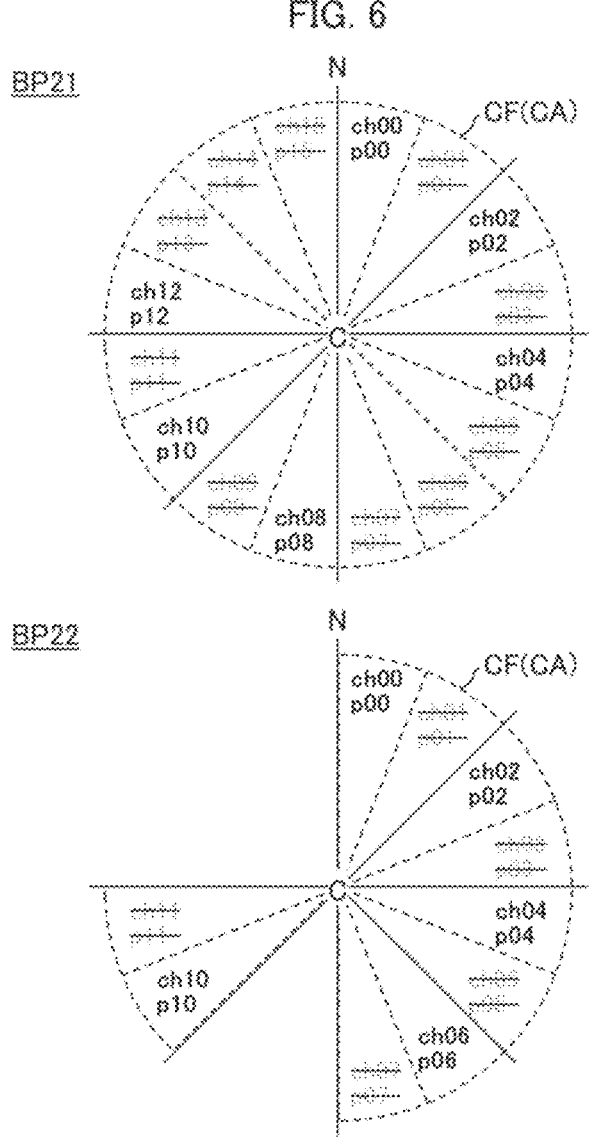
FIG. 6 is a view schematically illustrating a distribution of beams in accordance with an aspect of the present disclosure.
Figure 7:
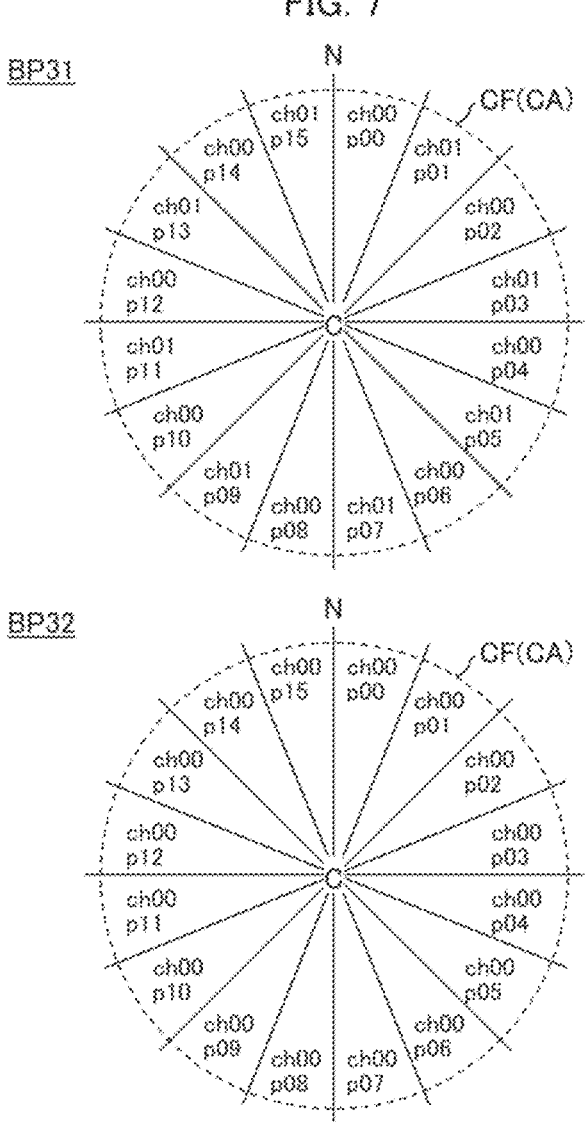
FIG. 7 is a view schematically illustrating a distribution of beams in accordance with an aspect of the present disclosure.

FIGS. 5 through 7 are diagrams schematically illustrating patterns of searching radio beams B1 that are set in the setting process S102*a*. FIG. 5 illustrates beam patterns BP11 through BP13. FIG. 6 illustrates beam patterns BP21 and BP22. FIG. 7 illustrates beam patterns BP31 and BP32.

The antenna 101 of the base station 100 is provided at a center C of each of the beam patterns BP11 through BP13, BP21, BP22, BP31, and BP32. FIGS. 5 through 7 illustrate views in each of which the searching radio beam B1 is viewed from above the antenna 101. The antenna 101 is driven by the transmission/reception section 102 to be able to simultaneously emit the plurality of searching radio beams B1 that are oriented in directions which are different from each other. The searching radio beam B1 is radially emitted from the antenna 101 toward a circumference CF around the center C.

(1) Beam aspect (1): The plurality of searching radio beams B1 simultaneously transmitted can include a first set of searching radio beams that have frequencies which are different from each other.

In this case, the first set of searching radio beams can include a plurality of searching radio beams B1 that have frequencies different from each other and that are adjacent to each other (beam aspect (1-1)).

The beam patterns BP11 through BP13 are examples of the beam aspect (1-1), and indicate the cases where the number of the searching radio beams B1 are 16, 8, and 4, respectively. It should be noted that the beam patterns BP12 and BP13 assume that the maximum number of the searching radio beams B1 is 16.

In the beam pattern BP11, 16 searching radio beams B1 (beam identifiers P00, P01, . . . , P15) are provided in order in the clockwise direction starting from the direction from the center C to the true north (N). That is, the circumference CF surrounding the center C is divided into 16 circular arcs CA, and the searching radio beams B1 of the beam identifiers P00 through P15 are allocated to the 16 respective circular arcs CA. The beam identifiers P00 through P15 are identifiers (beam IDs) that identify the searching radio beams B1 from each other.

The beam identifiers P00 through P15 are herein associated with the directions (beam directions) in which the searching radio beams B1 are emitted, and are set in ascending order (from 00 to 15) starting from the direction of the true north (N). By associating the beam identifiers P00 through P15 with the emission directions of the beam, it is made easy to determine the direction of the beam from the beam identifiers. It should be noted that the beam identifiers P00 through P15 may not need to be associated with the emission directions of the searching radio beams B1.

In correspondence with the beam identifiers P00 through P15, channel identifiers ch00 through ch15 are set. The channel identifiers ch00 through ch15 correspond to the channels of the searching radio beam B1, that is, to the frequencies of the searching radio beams B1. The numbers (00 through 15) in the channel identifiers ch00 through ch15 correspond to the channels, that is, the size of the frequencies, of the searching radio beams B1. The frequencies of the searching radio beams B1 are herein set in ascending order starting from the direction of the true north (N). However, the frequencies of the searching radio beams B1 may be set in descending order. In addition, this order may be changed as appropriate.

The frequencies of the searching radio beams B1 are set in order so as to correspond to the directions (beam directions) in which the searching radio beams B1 are emitted. This causes the channels (frequencies) of the adjacent searching radio beams B1 to be different from each other. Thus, even when a communication terminal 200(i) is provided in the vicinity of a boundary between adjacent searching radio beams B1, the adjacent searching radio beams B1 are prevented from interfering with each other at the communication terminal 200(i).

In the beam pattern BP11, the searching radio beams B1 of the beam identifiers P00 through P15 are provided adjacently without a gap such that adjacent searching radio beams B1 have channels which are different from each other. That is, the searching radio beams B1 of the beam identifiers P00 through P15 can, without scanning, search for the communication terminals 200(i) that are provided in all the directions from the center C.

As has been discussed, the beam identifiers P00 through P15, the emission directions of the searching radio beams B1, and the channel identifiers ch00 through ch15 (that is, the channels and frequencies of the searching radio beams B1) correspond to each other. That is, the beam identifiers can function as (i) beam identification information that identifies a plurality of searching radio beams B1, (ii) direction identification information that identifies the emission directions of the searching radio beams B1, and (iii) frequency identification information that identifies the channels (frequencies) of the searching radio beams B1.

The plurality of searching radio beams B1 each preferably include information pertaining to a beam identifier and a channel identifier. In such a case, a communication terminal 200(i) can easily extract beam identification information, direction identification information, and frequency identification information from the searching radio beam B1 received.

The tables Ta and Tb preferably indicate the beam identifiers P00 through P15, the emission directions of the searching radio beams B1, and the channel identifiers ch00 through ch15 (the channels and frequencies of the searching radio beams B1) such that the three are associated with each other. By using the table Ta, the control section 103 of the base station 100 can easily impart information of the beam identifier (also information of the channel identifier as necessary) to the searching radio beam B1. By using the table Tb, the control section 203 of the communication terminal 200(i) can easily identify the direction and the channel (frequency) of the searching radio beam B1 from the information (beam identification information) of the beam identifier that has been extracted from the searching radio beam B1.

In the beam patterns BP12 and BP13, eight and four searching radio beams B1 are used, respectively. The beam patterns BP12 and BP13 assume that the maximum number of the searching radio beams B1 is 16, and impart the smallest beam identifier of the beam pattern BP11 to each of the searching radio beams B1 as follows.

In the beam pattern BP12, the circumference CF is divided into eight circular arcs CA, and the searching radio beams B1 of every other beam identifiers P00, P02, P04, P06, . . . , P14 are allocated to the eight respective circular arcs CA (eight searching radio beams B1). In the beam pattern BP13, the circumference CF is divided into four circular arcs CA, and the searching radio beams B1 of every three beam identifiers P00, P04, P08, and P12 are allocated to the four respective circular arcs CA (four searching radio beams B1). The beam identifiers that are not allocated to any are not used.

It is possible to thus enlarge the widths of the searching radio beams B1 and allocate a search of a wide angle range to each searching radio beam B1. Thus, it is possible to search for communication terminals 200(i) with a smaller number of searching radio beams B1.

In the beam pattern BP21, six searching radio beams B1 of beam identifiers p00, p02, p04, p08, p10, and p12 are used. The searching radio beams B1 of the beam identifiers p00, p02, p08, and p10 correspond to the searching radio beams B1 of the beam pattern BP12, in which the circumference is divided into eight directions. The searching radio beams B1 of the beam identifiers p04 and p12 correspond to the searching radio beams B1 of the beam pattern BP13, in which the circumference is divided into four directions. It is thus possible to mix searching radio beams B1 of different widths.

The control section 103 may change the widths of the searching radio beams B1 according to the type (performance) of the antenna 101 or the interference state of the radio waves. For example, in a direction in which the interference state of the radio waves is relatively good, the widths of searching radio beams B1 may be enlarged so as to allocate a wide angle range to each searching radio beam B1. Meanwhile, in a direction in which the interference state of the radio waves is relatively poor, the widths of the searching radio beams B1 are preferably narrowed so as to allocate a narrow angle range to each searching radio beam B1.

In the beam pattern BP22, five searching radio beams B1 of the beam identifiers p00, p02, p04, p06, and p10 are used. These searching radio beams B1 correspond to the searching radio beams B1 of the beam pattern BP12, in which the circumference is divided into eight directions. The searching radio beams B1 of the beam identifiers p06 and p10 are separate from each other. The searching radio beams B1 of the beam identifiers p10 and p00 are separate from each other. That is, no searching radio beams B1 are provided between the beam identifiers p06 and p10 and between the beam identifiers p10 and p00. Some (or all) of the plurality of searching radio beams B1 simultaneously emitted do not need to be adjacent.

The control section 103 may set a direction in which the searching radio beams B1 are not to be emitted, according to the type (performance) of the antenna 101 or the interference state of the radio waves. For example, when there is a direction in which beams cannot be transmitted and/or received due to, for example, the characteristics of the antenna 101, the control section 103 sets the searching radio beams B1 in such a manner as to avoid the direction. When there is a direction in which it is substantially impossible to search for a communication terminal 200(i) due to a poor interference state of radio waves, the control section 103 may set the searching radio beams B1 in such a manner as to avoid the direction.

If a direction in which the searching radio beams B1 are not to be emitted is temporarily set, it may be made possible to emit a searching radio beam B1 in all directions by scanning the searching radio beams B1. In the beam pattern BP22, the communication terminals 200(*i*) that are provided between the searching radio beams B1 of the beam identifiers p06 and p10 and the communication terminals 200(*i*) that are provided between the searching radio beams B1 of the beam identifiers p10 and p00 are not subject to the search performed by the base station 100. However, any of the searching radio beams B1 of the beam identifiers p06 and p10, for example, is to be scanned. Thus, the communication terminals 200(*i*) that are provided between the beam identifiers p06 and p10 can be searched for. Similarly, by scanning any of the searching radio beams B1 of the beam identifiers p10 and p00, it is possible to search for a communication terminal 200(*i*) that is provided between the beam identifiers p10 and p00. The details of scanning of the searching radio beams B1 will be discussed later.

(2) Beam aspect (2): The plurality of searching radio beams B1 simultaneously transmitted can include a second set of searching radio beams that have identical frequencies and that are separate from each other.

A case where a plurality of searching radio beams B1 having identical channels are separate is herein considered. If a plurality of searching radio beams B1 having identical channels are adjacent (such as the beam pattern BP32 discussed later), there is a possibility of interference is occurring between communication terminals 200(*i*). In this case, the communication terminals 200(*i*) that are provided in the vicinity of the boundary between the searching radio beams B1 may simultaneously receive the searching radio beams B1 so that pieces of information on the searching radio beams B1 may be mixed (that is, interference). Even when a plurality of searching radio beams B1 have identical channels, causing the plurality of searching radio beams B1 to be separate makes it possible to prevent the communication terminals 200(*i*) from simultaneously receiving the searching radio beams B1 and causing interference.

In such a case, in order to search for a communication terminal 200(*i*) that is provided between a plurality of separate searching radio beams B1, a searching radio beam B1 can be scanned. This scanning can be performed by, for example, as discussed in (a) or (b) next.

(a) In the transmission process, the control section 103 can transmit the second set of searching radio beams while changing the directions of the second set of searching radio beams. This means that the directions of the searching radio beams are changed continuously.

(b) In the transmission process, the control section 103 stops transmitting the second set of searching radio beams and transmits a third set of searching radio beams that have identical frequencies, that are separate from each other, and that do not overlap the second set of searching radio beams in direction. This means that the directions of the searching radio beams are changed intermittently.

By thus changing the directions of the searching radio beams B1 with time, it is made possible to search for communication terminals 200(*i*) in all directions with use of a plurality of searching radio beams B1 that have identical channels.

In the beam pattern BP31, scanning of searching radio beams B1 is made unnecessary by combining the two sets of searching radio beams B1 in the beam aspect (2). In the beam pattern BP31, channel identifiers ch00 and ch01 are alternately allocated to beam identifiers p00 through p15. That is, by alternately allocating two channels to adjacent searching radio beams B1, it is possible to prevent interference between the adjacent searching radio beams B1 and to simultaneously transmit searching radio beams B1 in all directions.

Although two channels ch00 and ch01 are herein allocated alternately, three or more channels (for example, channels ch00 through ch02) may be allocated in order. Alternatively, the order of the channels ch00 through ch02 may not need to be constant. The order of the channels can be changed as appropriate, provided that channels are not identical between adjacent searching radio beams B1.

Meanwhile, in the beam pattern BP32, an identical channel identifier ch00 is allocated to all the beam identifiers p00 through p15. This beam pattern BP22 is preferably not used for searching radio beams B1.

(3) Beam aspect (3) (mixture of beam aspects (1) and (2)):
The plurality of searching radio beams B1 can include a first set of searching radio beams that have frequencies which are different from each other and a second set of searching radio beams that have identical frequencies and that are separate from each other.

C. Transmission of Searching Radio Beams B1 from Base Station 100 (Transmission Process S111*a*)

The control section 103 of the base station 100 controls the transmission/reception section 102 to execute a transmission process of simultaneously transmitting, from the antenna 101, a plurality of searching radio beams B1 that are oriented in directions which are different from each other.

As discussed above, the control section 103 of the base station 100 use the beam aspects (1), (2), and (3) to transmit a searching radio beams B1 in a plurality of directions. In doing so, the control section 103 can include beam identifiers in the searching radio beams B1.

D. Reception of Searching Radio Beam B1 by Communication Terminal 200(*i*) (Reception Process S111*b*)

The control section 203 of the communication terminal 200(*i*) executes a reception process of receiving, via the antenna 201, any of the plurality of searching radio beams B1 that have been transmitted from the base station 100 and that are oriented in directions which are different from each other.

E. Extraction of Beam Identification Information by Communication Terminal 200(*i*) from Searching Radio Beam B1 (Extraction Process S112*b*)

The control section 203 of the communication terminal 200(*i*) extracts beam identification information from a searching radio beam B1. This extraction is divided into cases (a) and (b) where the searching radio beam B1 includes and does not include a beam identifier, respectively.

(a) Case where Searching Radio Beam B1 Includes Beam Identifier

The control section 203 of the communication terminal 200(*i*) extracts a beam identifier from a searching radio beam B1 that has been received by the antenna 201. The beam identifier functions as beam identification information that identifies a searching radio beam.

With use of the table Ta, the control section 203 can identify the frequency (channel) and the direction of the searching radio beam B1. This method can be applied to both a case that corresponds to the beam aspect (2) (in which a plurality of searching radio beams B1 that have been simultaneously emitted include searching radio beams B1 of identical channels) and a case that does not correspond to the beam aspect (2).

(b) Case where Searching Radio Beam B1 does not Include Beam Identifier

The control section 203 of the communication terminal 200(*i*) employs a fast Fourier transform (FFT) to extract information (frequency identification information) of the frequency (channel) of the searching radio beam B1 that has been received by the antenna 201.

The control section 203 can identify the direction of the searching radio beam B1 with use of the extracted frequency identification information and the table Tb (which indicates the frequency identification information and the direction identification information in an associated manner). It should be noted that this method is difficult to apply to a case that corresponds to the beam aspect (2) (in which a plurality of searching radio beams B1 that have been simultaneously emitted include searching radio beams B1 of identical channels).

F. Transmission of Radio Waves from Communication Terminal 200(*i*) (Transmission Process S113*b*)

The control section 203 of the communication terminal 200(*i*) executes a t transmission process of transmitting radio waves from the antenna 201 in accordance with the searching radio beam B1 that has been transmitted from the base station 100.

This transmission is to make notification that the communication terminal 200(*i*) has received a searching radio beam B1 from the base station 100 and can communicate with the base station 100. This notification allows the base station 100 to determine that a search for a communication terminal 200(*i*) has ended and that it is possible to communicate with the communication terminal 200(*i*) that has been found.

With use of the channel of the received searching radio beam B1, the communication terminal 200(*i*) can notify the base station 100 of the beam identifier that is available for the communication. The communication terminal 200(*i*) may use the radio waves to make the notification without making a change to the frequency from the one for communication.

It should be noted here that the communication terminal 200(*i*) is capable of transmitting, to the base station 100, radio waves that substantially do not include directivity. However, when the antenna 201 of the communication terminal 200(*i*) can transmit a radio beam including directivity, the communication terminal 200(*i*) may communicate with the base station 100 with use of radio waves (i.e., radio beam) including directivity.

A case is assumed where the searching radio beam B1 that has been transmitted from the base station 100 includes direction identification information which identifies the direction of the base station 100. In this case, the control section 23 of the communication terminal 20(*i*) can execute the extraction process S112*b* of extracting, from the searching radio beam B1 that has been received in the reception process S111*b*, direction identification information that identifies the direction of the base station 100. Then, in the transmission process S113*b*, the control section 203 of the communication terminal 200(*i*) can transmit radio beams toward the base station 100, based on the direction identification information that has been extracted in the extraction process. Then, with use of the radio beams transmitted in the transmission process S113*b*, it is possible to execute a communication process of communicating with the base station 100.

G. Reception of Radio Waves by Base Station 100 (Reception Process S113*a*)

The control section 103 of the base station 100 executes a reception process of receiving the radio waves transmitted from the communication terminal 200(*i*) in accordance with the plurality of searching radio beams B1 simultaneously transmitted in the transmission process S111*a*. This notification allows the base station 100 to determine that a search for a communication terminal 200(*i*) has ended and that it is possible to communicate with the communication terminal 200(*i*) that has been found.

H. Communication Between Base Station 100 and Communication Terminal 200(*i*) (Communication Process S121*a*, S121*b*)

The control section 103 of the base station 100 uses the communication radio beam B2 to execute a communication process of communicating with the communication terminal 200(*i*) that has transmitted the radio waves received in the reception process S113*a*. Meanwhile, the control section 203 of the communication terminal 200(*i*) uses the radio beam transmitted from the transmission process S113*b* to execute a communication process of communicating with the base station 100.

For example, the plurality of searching radio beams B1 have frequencies that are different from each other and directions that are different from each other and, in the reception process S111*b*, the radio waves received by the communication terminal 200(*i*) may include beam identification information that identifies a plurality of searching radio beams B1. In this case, the control section 203 may, in the communication process S121*b*, communicate with the base station 100 with use of a communication radio beam having a frequency and a direction that corresponds to the frequency and the direction of the searching radio beams B1 which has been identified by the beam identification information.

The base station 100 uses the communication radio beam B2 to communicate with the communication terminal 200(*i*). In doing so, the base station 100 may use a single communication radio beam B2 to communicate with a plurality of communication terminals 200(*i*). By communicating while switching between the plurality of communication terminals 200(*i*) with time, it is possible to communicate with the plurality of communication terminals 200(*i*) in parallel.

As has been discussed, the base station 100 simultaneously transmits, from the antenna, a plurality of searching radio beams that are oriented in directions which are different from each other. Thus, a search for communication terminals 200(*i*) can be performed efficiently.

[Software Implementation Example]

The functions of all or part of the base station 100 and the communication terminal 200 (hereinafter also referred to as "each apparatus") can be realized by hardware such as an integrated circuit (IC chip) or can be alternatively realized by software.

Figure 8:
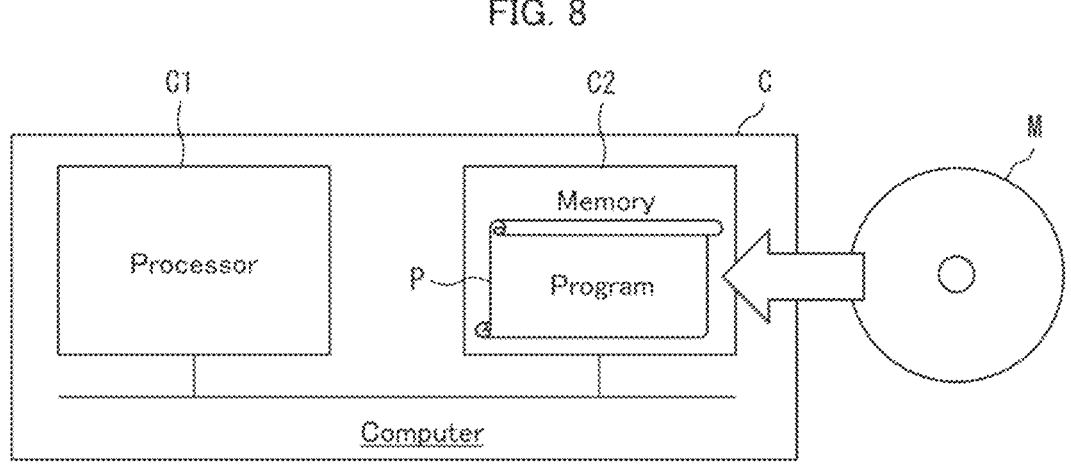
FIG. 8 is a block diagram illustrating the configuration of a computer that functions as the control section of the base station or the communication terminal in accordance with an aspect of the present disclosure.

In the latter case, each of the apparatuses is realized by, for example, a computer that executes instructions of a program that is software realizing the foregoing functions. FIG. 8 illustrates an example of such a computer (hereinafter, referred to as "computer C"). FIG. 8 is a block diagram illustrating a hardware configuration of the computer C which functions as each apparatus.

The computer C includes at least one processor C1 and at least one memory C2. The memory C2 stores a program P for causing the computer C to function as each apparatus. In the computer C, the processor C1 reads the program P from the memory C2 and executes the program P, so that the functions of each apparatus are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other devices. The computer C can further include an input/output interface for connecting the computer C to an input/output apparatus(es) such as a keyboard, a mouse, a display and/or a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can a be, for example, communications network, a broadcast wave, or the like. The computer C can obtain the program P also via such a transmission medium.

[Additional Remark 1]

The present disclosure includes techniques discussed in supplementary notes below. Note, however, that the present limited to the techniques discussed in supplementary notes below, but may be altered in various ways by a skilled person within the scope of the claims.

Supplementary Note 1

A base station for a communication terminal, said base station including: an antenna that emits at least one searching radio beam for searching for a communication terminal and a communication radio beam for communicating with a communication terminal; and a control section, the control section configured to execute a transmission process of simultaneously transmitting, from the antenna, a plurality of searching radio beams that are oriented in directions which are different from each other, a reception process of receiving radio waves transmitted from a communication terminal in accordance with the plurality of searching radio beams simultaneously transmitted in the transmission process, and a communication process of communicating, with use of the communication radio beam, with the communication terminal that transmitted the radio waves which were received in the reception process.

Supplementary Note 2

The base station according to supplementary note 1, in which the plurality of searching radio beams include a first set of searching radio beams that have frequencies which are different from each other.

Supplementary Note 3

The base station according to supplementary note 2, in which the first set of searching radio beams include a plurality of searching radio beams that have frequencies different from each other and that are adjacent to each other.

Supplementary Note 4

The base station according to any one of supplementary notes 1 through 3, in which the plurality of searching radio beams include a second set of searching radio beams that have identical frequencies and that are separate from each other.

Supplementary Note 5

The base station according to supplementary note 4, in which in the transmission process, the control section transmits the second set of searching radio beams while changing the directions of the second set of searching radio beams.

Supplementary Note 6

The base station according to supplementary note 4, in which in the transmission process, the control section stops transmitting the second set of searching radio beams and transmits a third set of searching radio beams that have identical frequencies, that are separate from each other, and that do not overlap the second set of searching radio beams in direction.

Supplementary Note 7

The base station according to any one of supplementary notes 1 through 6, further including a storage section that stores a table which indicates frequencies and transmission directions of the plurality of searching radio beams in such a manner that the frequencies and the transmission directions are associated with each other, in which in the transmission process, the control section transmits the plurality of searching radio beams using the frequencies and the directions based on the table.

Supplementary Note 8

The base station according to supplementary note 7, in which: in the table, frequencies and transmission directions of the plurality of searching radio beams and at least one selected from the group consisting of the number of the plurality of searching radio beams, the type of the antenna, and an interference state of radio waves are indicated in such a manner as to be associated with each other; and the control section executes an acquisition process of acquiring information of the at least one selected from the group consisting of the number of the plurality of searching radio beams, the type of the antenna, and the interference state of the radio waves and, in the transmission process, transmits the plurality of searching radio beams using the frequencies and the directions based on the table.

Supplementary Note 9

The base station according to any one of supplementary notes 1 through 8, in which: the plurality of searching radio beams have frequencies that are different from each other and directions that are different from each other; in the reception process, radio waves received by the communication terminal have beam identification information that identifies the plurality of searching radio beams; and in the communication process, the control section communicates with the communication terminal with of use of a communication radio beam having a frequency and a direction that correspond to a frequency and a direction of a searching radio beam which has been identified by the beam identification information.

Supplementary Note 10

A communication terminal that communicates with the base station according to supplementary note 1, the communication terminal including an antenna that transmits and receives radio waves and a control section, the control section being configured to execute a reception process of receiving, via the antenna, any of a plurality of searching radio beams that have been transmitted from the base station and that are oriented in directions which are different from each other, an extraction process of extracting, from a searching radio beam received in the reception process, direction identification information that identifies a direction of the base station, a transmission process of transmitting a radio beam toward the base station based on the direction identification information that has been extracted in the extraction process, and a communication process of communicating with the base station with use of the radio beam that has been transmitted in the transmission process.

Supplementary Note 11

A communication method for a base station, the method including: a transmission process of transmitting, from an antenna, a plurality of searching radio beams that are oriented in directions which are different from each other; a reception process of receiving radio waves transmitted from a communication terminal in accordance with the plurality of searching radio beams transmitted in the transmission process; and a communication process of communicating, with use of the communication radio beam, with the communication terminal that transmitted the radio waves which were received in the reception process.

Supplementary Note 12

A communication method for a communication terminal, the method including a reception process of receiving, via the antenna, any of a plurality of searching radio beams that have been transmitted from the base station according to supplementary note 1 and that are oriented in directions which are different from each other, an extraction process of extracting, from a searching radio beam received in the reception process, direction identification information that identifies a direction of the base station, a transmission process of transmitting a radio beam toward the base station based on the direction identification information that has been extracted in the extraction process, and a communication process of communicating with the base station with use of the radio beam that has been transmitted in the transmission process.

Supplementary Note 13

A program for causing a computer to function as the control section according to any one of supplementary notes 1 through 9.

Supplementary Note 14

A program for causing a computer to function as the control section according to supplementary note 10.
[Additional Remark 2]
The present disclosure includes techniques discussed in supplementary notes below. Note, however, that the present invention is not limited to the techniques discussed in supplementary notes below, but may be altered in various ways by a skilled person within the scope of the claims.

Supplementary Note 1

A base station for a communication terminal, said base station including: an antenna that emits at least one searching radio beam for searching for a communication terminal and a communication radio beam for communicating with a communication terminal; and at least one processor, the at least one processor being configured to execute a transmission process of simultaneously transmitting, from the antenna, a plurality of searching radio beams that are oriented in directions which are different from each other, a reception process of receiving radio waves transmitted from a communication terminal in accordance with the plurality of searching radio beams simultaneously transmitted in the transmission process, and a communication process of communicating, with use of the communication radio beam, with the communication terminal that transmitted the radio waves which were received in the reception process.

Supplementary Note 2

The base station according to supplementary note 1, in which the plurality of searching radio beams include a first set of searching radio beams that have frequencies which are different from each other.

Supplementary Note 3

The base station according to supplementary note 2, in which the first set of searching radio beams include a plurality of searching radio beams that have frequencies different from each other and that are adjacent to each other.

Supplementary Note 4

The base station according to any one of supplementary notes 1 through 3, in which the plurality of searching radio beams include a second set of searching radio beams that have identical frequencies and that are separate from each other.

Supplementary Note 5

The base station according to supplementary note 4, in which in the transmission process, the at least one processor transmits the second set of searching radio beams while changing the directions of the second set of searching radio beams.

Supplementary Note 6

The base station according to supplementary note 4, in which in the transmission process, the at least one processor stops transmitting the second set of searching radio beams and transmits a third set of searching radio beams that have identical frequencies, that are separate from each other, and that do not overlap the second set of searching radio beams in direction.

Supplementary Note 7

The base station according to any one of supplementary notes 1 through 6, in which: the plurality of searching radio beams have frequencies that are different from other and directions that are different from each other; in the reception process, radio waves received by the communication terminal have beam identification information that identifies the plurality of searching radio beams; and in the communication process, the at least one processor communicates with the communication terminal with use of a communication radio beam having a frequency and a direction that correspond to a frequency and a direction of a searching radio beam which has been identified by the beam identification information.

Supplementary Note 8

The base station according to any one of supplementary notes 1 through 7, further including a memory that stores a table which indicates frequencies and transmission directions of the plurality of searching radio beams in such a manner that the frequencies and the transmission directions are associated with each other, in which in the transmission process, the at least one processor transmits the plurality of searching radio beams using the frequencies and the directions based on the table.

Supplementary Note 9

The base station according to supplementary note 8, in which: in the table, frequencies and transmission directions of the plurality of searching radio beams and at least one selected from the group consisting of the number of the plurality of searching radio beams, the type of the antenna, and an interference state of radio waves are indicated in such a manner as to be associated with each other; and the at least one processor executes an acquisition process of acquiring information of the at least one selected from the group consisting of the number of the plurality of searching radio beams, the type of the antenna, and the interference state of the radio waves and, in the transmission process, transmits the plurality of searching radio beams using the frequencies and the directions based on the table.

Supplementary Note 10

A communication terminal that communicates with the base station according to supplementary note 1, the communication terminal including an antenna that transmits and receives radio waves and at least one processor, the at least one processor being configured to execute a reception process of receiving, via the antenna, any of a plurality of searching radio beams that have been transmitted from the base station and that are oriented in directions which are different from each other, an extraction process of extracting, from a searching radio beam received in the reception process, direction identification information that identifies a direction of the base station, a transmission process of transmitting a radio beam toward the base station based on the direction identification information that has been extracted in the extraction process, and a communication process of communicating with the base station with use of the radio beam that has been transmitted in the transmission process.

The base station and the communication terminal may further include a memory. The memory may store a program for causing the at least one processor to execute each of the foregoing processes.

REFERENCE SIGNS LIST 1, 2 Communication system
10, 100 Base station
20, 200 Communication terminal
11, 21, 101, 201 Antenna
12, 22, 102, 202 Transmission/reception section
13, 23, 103, 203 Control section
104, 204 Storage section 105 Input/output section
S1, S1a, S1b, S10, S10a, S10b Communication method
S101a Acquisition process
S102a Setting process
S11a, S12b, S111a, S113b Transmission process
S11b, S12a, S111b, S113a Reception process
S112b Extraction process
S13a, S13b, S121a, S121b Communication process
Ta, Tb Table

The invention claimed is:

1. A base station for a communication terminal, said base station comprising:
   an antenna that emits at least one searching radio beam for searching for the communication terminal and a communication radio beam for communicating with the communication terminal; and
   at least one processor,
   the at least one processor being configured to execute
      a transmission process of simultaneously transmitting, from the antenna, a plurality of searching radio beams that are oriented in directions which are different from each other,
      a reception process of receiving radio waves transmitted from the communication terminal in accordance with the plurality of searching radio beams simultaneously transmitted in the transmission process, and
      a communication process of communicating, with use of the communication radio beam, with the communication terminal that transmitted the radio waves which were received in the reception process, wherein
   the plurality of searching radio beams include a second set of searching radio beams that have identical frequencies and that are separate from each other.

2. The base station according to claim 1, wherein in the transmission process, the at least one processor transmits the second set of searching radio beams while changing the directions of the second set of searching radio beams.

3. The base station according to claim 1, wherein in the transmission process, the at least one processor
   stops transmitting the second set of searching radio beams and
   transmits a third set of searching radio beams that have identical frequencies, that are separate from each other, and that do not overlap the second set of searching radio beams in direction.

4. The base station according to claim 1, further comprising
   a memory that stores a table which indicates frequencies and transmission directions of the plurality of searching radio beams in such a manner that the frequencies and the transmission directions are associated with each other, wherein
   in the transmission process, the at least one processor transmits the plurality of searching radio beams using the frequencies and the directions based on the table.

5. The base station according to claim 4, wherein:
   in the table, frequencies and transmission directions of the plurality of searching radio beams and at least one selected from the group consisting of the number of the plurality of searching radio beams, the type of the antenna, and an interference state of radio waves are indicated in such a manner as to be associated with each other; and
   the at least one processor executes an acquisition process of acquiring information of the at least one selected from the group consisting of the number of the plurality of searching radio beams, the type of the antenna, and the interference state of the radio waves and, in the transmission process, transmits the plurality of searching radio beams using the frequencies and the directions based on the table.

6. A communication terminal that communicates with a base station, the communication terminal comprising an antenna that transmits and receives radio waves and at least one processor, the at least one processor being configured to execute a reception process of receiving, via the antenna, any of a plurality of searching radio beams that have been transmitted from the base station and that are oriented in directions which are different from each other, an extraction process of extracting, from a searching radio beam received in the reception process, direction identification information that identifies a direction of the base station, a transmission process of transmitting a radio beam toward the base station based on the direction identification information that has been extracted in the extraction process, and a communication process of communicating with the base station with use of the radio beam that has been transmitted in the transmission process, wherein the plurality of searching radio beams include a second set of searching radio beams that have identical frequencies and that are separate from each other.

7. A communication method for a base station, the method comprising:

a transmission process of transmitting, from an antenna, a plurality of searching radio beams that are oriented in directions which are different from each other;

a reception process of receiving radio waves transmitted from a communication terminal in accordance with the plurality of searching radio beams transmitted in the transmission process; and a communication process of communicating, with use of the communication radio beam, with the communication terminal that transmitted the radio waves which were received in the reception process, wherein the plurality of searching radio beams include a second set of searching radio beams that have identical frequencies and that are separate from each other.

8. The method according to claim 7, wherein the transmission process includes a process of transmitting the second set of searching radio beams while changing the directions of the second set of searching radio beams.

9. The method according to claim 7, wherein the transmission process includes a process of (i) stopping transmitting the second set of searching radio beams and (ii)) transmitting a third set of searching radio beams that have identical frequencies, that are separate from each other, and that do not overlap the second set of searching radio beams in direction.

10. The method according to claim 7, wherein the transmission process includes a process of transmitting the plurality of searching radio beams using frequencies and directions based on a table which indicates frequencies and transmission directions of the plurality of searching radio beams in such a manner that the frequencies and the transmission directions are associated with each other.

11. The method according to claim 10, wherein in the table, frequencies and transmission directions of the plurality of searching radio beams and at least one selected from the group consisting of the number of the plurality of searching radio beams, the type of the antenna, and an interference state of radio waves are indicated in such a manner as to be associated with each other, the method further comprises an acquisition process of acquiring information of the at least one selected from the group consisting of the number of the plurality of searching radio beams, the type of the antenna, and the interference state of the radio waves and the transmission process includes a process of transmitting the plurality of searching radio beams using the frequencies and the directions based on the table.

* * * * *